(12) United States Patent
Floch et al.

(10) Patent No.: US 9,816,380 B2
(45) Date of Patent: Nov. 14, 2017

(54) TURBINE ROTOR FOR A THERMOELECTRIC POWER STATION

(71) Applicant: ALSTOM Technology Ltd, Baden (CH)

(72) Inventors: Michel Floch, Drancy (FR); Arnaud Buguin, Toussus le Noble (FR); Julien Lemaire, La Garenne Colombes (FR)

(73) Assignee: General Electric Technology GmbH, Baden (CH)

( * ) Notice: Subject to any disclaimer, the term of this patent is extended or adjusted under 35 U.S.C. 154(b) by 507 days.

(21) Appl. No.: 14/199,644

(22) Filed: Mar. 6, 2014

(65) Prior Publication Data
US 2014/0255192 A1 Sep. 11, 2014

(30) Foreign Application Priority Data
Mar. 7, 2013 (FR) ...................................... 13 52074

(51) Int. Cl.
| | |
|---|---|
| *F01D 5/22* | (2006.01) |
| *F01D 5/14* | (2006.01) |
| *F01D 5/30* | (2006.01) |
| *B23P 15/04* | (2006.01) |

(52) U.S. Cl.
CPC ............. *F01D 5/22* (2013.01); *B23P 15/04* (2013.01); *F01D 5/141* (2013.01); *F01D 5/225* (2013.01); *F01D 5/3023* (2013.01); *F01D 5/3053* (2013.01); *F05D 2220/31* (2013.01); *Y10T 29/49321* (2015.01)

(58) Field of Classification Search
CPC . F01D 5/22; F01D 5/225; F01D 11/08; F01D 5/3053

USPC .................................................. 416/191, 195
See application file for complete search history.

(56) References Cited

U.S. PATENT DOCUMENTS

| | | | |
|---|---|---|---|
| 4,076,455 A | 2/1978 | Stargardter | |
| 4,840,539 A * | 6/1989 | Bourcier | ................. F01D 5/225 416/191 |
| 5,261,785 A * | 11/1993 | Williams | ................ F01D 25/32 415/169.2 |
| 6,341,941 B1 | 1/2002 | Namura et al. | |
| 6,846,160 B2 * | 1/2005 | Saito | ....................... F01D 5/141 416/190 |
| 8,096,775 B2 * | 1/2012 | Riaz | ....................... F01D 5/225 416/212 R |
| 8,333,562 B2 * | 12/2012 | Asai | ......................... F01D 5/16 416/190 |

(Continued)

FOREIGN PATENT DOCUMENTS

| | | |
|---|---|---|
| CN | 88100914 A | 9/1988 |
| CN | 2479214 Y | 2/2002 |

(Continued)

OTHER PUBLICATIONS

Trukhniy A.D., et al., "Heat Extraction Steam Turbines and Turbine Plants", Moscow, Publishing house MEI, pp. 68-70, 2002.

(Continued)

*Primary Examiner* — Matthew W Jellett
(74) *Attorney, Agent, or Firm* — GE Global Patent Operation; Cynthia W. Flanigan

(57) ABSTRACT

Low-pressure turbine rotors for a thermoelectric power station include an interconnection of slender blades. The rotor includes blades bearing caps being roughly in the shape of a chevron.

9 Claims, 5 Drawing Sheets

(56) References Cited

U.S. PATENT DOCUMENTS

| | | | |
|---|---|---|---|
| 9,347,326 B2 * | 5/2016 | Kim | ......................... F01D 5/303 |
| 2002/0057969 A1 | 5/2002 | Namura et al. | |
| 2003/0228225 A1 | 12/2003 | Saito et al. | |

FOREIGN PATENT DOCUMENTS

| | | |
|---|---|---|
| CN | 1352725 A | 6/2002 |
| CN | 2711391 Y | 7/2005 |
| JP | H11294102 | 10/1999 |
| SU | 641128 A1 | 1/1979 |
| SU | 1315865 A1 | 6/1987 |

OTHER PUBLICATIONS

Unofficial English Translation of Russian Office Action issued in connection with corresponding RU Application No. 2014107544 dated Oct. 19, 2016.

\* cited by examiner

TURBINE ROTOR FOR A THERMOELECTRIC POWER STATION

CROSS-REFERENCES TO RELATED APPLICATIONS

This application claims priority to French application 1352074 filed Mar. 7, 2013, the contents of which are hereby incorporated in its entirety.

TECHNICAL FIELD

The technical field of the invention is that of low-pressure turbine rotors for a thermoelectric power station, and more specifically that of the interconnection of slender blades.

BACKGROUND

The problem in connecting slender blades to a rotor shaft for a low-pressure turbine rotor for a thermoelectric power station is that this connection must ensure safe vibration behavior when the rotor is in rotation.

Turbine rotors for thermoelectric power stations are generally known, the rotor comprising:
  one disk secured to a shaft which can rotate about a reference axis, the disk comprising on its periphery first interfaces; and
  a plurality of blades, each of the blades being of the slender type and comprising an airfoil having a lower end and an upper end, the lower end being secured to a root having a second interface for engaging with the first interfaces of the disk.

When the collection of blades is attached to the disk so as to form a blading, a fluid acting on this blading causes the rotor to rotate.

The usefulness of interconnecting the blades results from the need to control the frequency behavior of a rotor. Indeed, the blades of a blading are subject to dynamic loads due to the flow of steam through said blading. These loads can give rise to stress levels in the blades causing these to fail through fatigue. The term "fatigue" is understood as damage to a material caused by cyclic loads at a relatively high stress level with respect to the elastic limit of said material, causing the material to fail over a large number of cycles. It is therefore essential to reduce dynamic loads in the bladings by controlling the eigenfrequencies such that said eigenfrequencies are far apart from the excitation frequencies, said excitation frequencies depending on the pulsing of the flow of steam.

This phenomenon is found in all the blades of the turbine. Nonetheless, in the case of the most slender blades (generally, the blades of the latter stages of a low-pressure module), the eigenfrequencies are relatively low, resulting in a high risk of entering a resonant state, making the blades more easily excitable.

One of the existing solutions for interconnecting the blades, these blades being of the slender type, consists in putting in place a plurality of metal wires, each connecting at least two blades.

A second solution described in the prior art consists in putting in place a riveted band connecting a plurality of blades. Such a band can, in particular, be located at the upper end of the blade, that is to say at that end of the blade which is further from the disk secured to the shaft.

These connections have, in particular, the disadvantage of not continuously connecting the blades of one and the same wheel, with the result that the blades can have, in rotation, vibration behaviors which vary considerably from one to another.

Another known solution consists in arranging a cap on the upper end, said cap having at least one first end and one second end, these ends being peripheral, the caps of the blades together forming, once the blades are installed, a cylindrical structure arranged coaxially with the reference axis, the first end of one of said caps being arranged so as to engage with the second end of the cap which precedes it and the second end of this said cap being arranged so as to engage with the first end of the cap which succeeds it, around the rotor disk.

Each of the caps is thus integrated with the blade, ensuring a continuous and rigid connection, in operation, whatever the speed of rotation. In this way, the blading formed by the collection of blades attached to the disk has a cylindrical structure coaxial with the reference axis, wherein this structure can also be described as a peripheral band split into caps.

Nonetheless, such an embodiment has, in particular, the disadvantage that, when the rotor is in rotation, centrifugal force causes an untwisting of the blades, that is to say a torsion motion of each of the blades about an axis which is substantially radial with respect to the reference axis corresponding to an axis along which the airfoil of the blade extends. This results in a contact pressure between these blades, in particular between their caps, which decreases as the speed of rotation of the rotor increases. Moreover, in order to ensure continuous contact between the caps despite this untwisting effect, a torsion prestress is applied to the blade when it is installed on the disk of the rotor.

In the case of slender blades, the untwisting is substantial and, at high speeds, gives rise to a loss of contact between the caps of the blades. The dynamic behavior of the blading is then no longer controlled. Moreover, the torsion prestresses to be applied for such blades are also very substantial, producing mechanical loads which results in the blade having lower resistance to fatigue.

SUMMARY

The invention aims to resolve all or part of the disadvantages of the prior art, in particular the problems of loss of contact between the caps of the blades in the event of untwisting and prestress to be applied when installing the blades on a disk of the rotor, while proposing a solution which is cost-effective, easy to implement and which ensures optimum operational safety.

To that end, according to a first aspect, a rotor for a low-pressure turbine for a thermoelectric power station is proposed, said rotor comprising:
  at least one disk secured to a shaft which can rotate about a reference axis, the disk comprising on its periphery a first interface;
  a plurality of blades, each of the blades being of the slender type, comprising at least one airfoil and at least two ends:
    a lower end secured to a root having a second interface for engaging with the first interface of the disk; and
    an upper end secured to a cap, said cap having at least one first end and one second end;
  the caps of the blades together forming, once the blades are installed, a cylindrical structure arranged coaxially with the reference axis, the first end of one of said caps being arranged so as to engage with the second end of the cap which precedes it and the second end of this said cap being arranged so as to engage with the first end of the cap which succeeds it, around the rotor disk, said rotor being characterized in that:

the first interface of the disk has slots which are coaxial with respect to the reference axis, are parallel to each other and are of substantially equal radius; the second interface of each of the blades having projections oriented in the extension of said blade and engaging with at least part of the slots; the first and second interfaces each having rows of axial through openings which are in alignment when said first and second interfaces engage with each other, and into which pins are inserted; and each of the caps having on its first and second ends a main flat surface oriented substantially radially, the main flat surface forming, with a plane which is orthogonal to the reference axis, an angle α, said angle α being:

positive with respect to the direction of circulation of a fluid in the turbine along the reference axis, and substantially between 20 and 50°; and oriented counter to the torsion direction of each of the blades when the rotor is in rotation.

The term "slender", when relating to the blade, is understood to mean a blade which, in the technical field in question, has a ratio of tip radius to base radius which is greater than or equal to 1.5, where:

the base radius is the distance between the reference axis and the base of the blade; and the tip radius is the distance between the reference axis and the tip profile of the blade.

Such a configuration offers numerous advantages, both in terms of reliability of operation at high rotor speeds and in terms of implementation.

Indeed, when the collection of blades is attached to the disk so as to form a blading, a fluid acting on this blading causes the rotor to rotate. Moreover, when the rotor is in rotation, the centrifugal force acting on the blades causes an untwisting effect in these said blades, that is to say a torsion motion of the blade which results in a contact pressure which increases as the speed of rotation of the rotor increases.

Indeed, in the configuration described, in which each of the caps has, on its first and second ends, a flat surface oriented substantially radially and forming, with a plane which is orthogonal to the reference axis, an angle α, said angle α being:

positive with respect to the circulation of a fluid in the turbine along the reference axis, and substantially between 20 and 50°; and oriented counter to the torsion direction of each of the blades due to the fluid acting on its airfoil, this makes it possible for the contact pressure to change, increasing as the speed of rotation of the rotor increases. This therefore produces the opposite effect to that described by the prior art.

Such a feature of the contact pressure, which increases as the speed of rotation of the rotor increases, allows a reliable interconnection of the blades at a nominal speed and thus makes it possible to ensure that the pulsing of the steam flow does not start to resonate with the eigenfrequencies of the blades.

In addition, by virtue of such a cap, it is not necessary for a large torsion prestress to be applied to the blade when it is installed on the disk. Indeed, since the contact pressure between each of said caps increases with the speed of rotation of the rotor, this contact pressure can be low or even zero when at rest, which is to say when the speed of rotation of the turbine is zero.

Furthermore, in the prior art a torsion prestress was applied to a blade when it was installed, the blade comprising a root of the fir-tree type. The blade was thus installed by axial translation of its root in a slot arrangement of a disk provided to that end, the torsion prestress being produced during that step.

In our case, the torsion prestress is small with respect to the torsion force necessary in the prior art, thanks to the "self-tightening" aspect of the caps when the rotor is in rotation; the blade can thus be installed by radial translation. Indeed, in such a configuration, during installation, each of the projections of the second interfaces of the blades comes to engage, by radial translation of the blade toward the disk secured to the shaft, with the slots of the first interfaces of the disk. The torsion forces required for installing the blades are thus negligible or near zero.

According to another technical feature, each of the first and second ends of the caps is roughly in the shape of a chevron.

"In the shape of a chevron" is understood as "V"-shaped.

Such a shape makes it possible to improve the engagement of the ends of the caps two by two.

Advantageously, when the caps engage two by two and when the rotor is in rotation about the shaft, a contact surface is formed between two of said caps, said contact surface being located on the main flat surface.

According to one particular technical feature, the contact surface represents between 10 and 90% of the main flat surface.

This contact surface can be chosen by defining a main flat surface having or not having a greater or lesser surface, in particular a greater or lesser axial width. Such a choice of a predetermined dimensioning of the contact surface influences the level of tightness of the caps when the rotor is in rotation. Thus, a small surface will ensure, at a nominal speed of rotation of the rotor, a substantial "self-tightening" effect, and vice versa.

Advantageously, the first and/or the second end(s) of the caps has/have at least one first secondary flat surface located between the main flat surface and the fluid inflow side, said first secondary flat surface forming, with the plane which is orthogonal to the reference axis, an angle β which is positive with respect to the direction of circulation of a fluid in the turbine along the reference axis, and is substantially between 85 and 95°, more preferably substantially equal to 90°.

Moreover and advantageously, this makes it possible to design a cap of a blade so as to give it an axial width which is sufficient to provide it with optimum mechanical strength and an adapted main flat surface, which is dependent on the desired tightness of the contacts between the caps.

In one preferred embodiment, the main flat surface is delimited laterally by this first secondary flat surface located on the fluid inflow side.

In a similar manner and advantageously, the first and/or the second end(s) of the caps has/have at least one second secondary flat surface located between the main flat surface and a fluid outflow side, said second secondary flat surface forming, with the plane which is orthogonal to the reference axis, an angle □ which is positive with respect to the circulation of a fluid in the turbine along the reference axis, and is substantially between 100 and 175°.

In one preferred embodiment, the main flat surface is delimited laterally by this second secondary flat surface located on the fluid outflow side.

Furthermore, according to a second aspect of the invention, a thermoelectric power station is proposed, characterized in that it comprises at least one rotor.

According to another aspect of the invention, a method for installing the blades of a rotor as described hereinabove is also proposed, said method being characterized in that it comprises at least the following steps:
- a step of putting in place the blades on the disk, in which each of the projections of the second interfaces of the blades comes to engage, by radial translation of the blade toward the disk which is secured to the shaft, with the slots of the first interfaces of the disk; and
- a step of locking the blades on the disk, in which the pins are inserted into the main openings consisting of the rows of openings, then in alignment, of the first and second interfaces.

BRIEF DESCRIPTION OF THE FIGURES

Other features and advantages of the invention will emerge upon reading the following description, with reference to the appended figures, in which.

For more clarity, identical or similar elements are identified by means of identical reference signs in all the figures.

DETAILED DESCRIPTION

Figure 1:
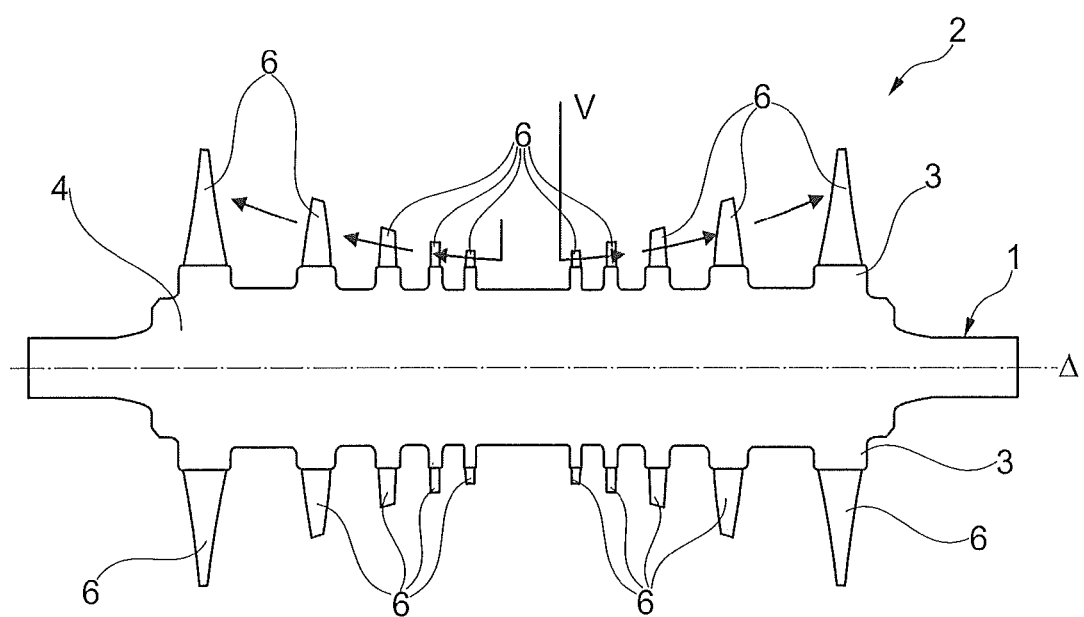
FIG. 1 shows a simplified diagram of a low-pressure module of a turbine according to one embodiment.

FIG. 1 shows a rotor 1 of a turbine 2 according to one embodiment. Indeed, this figure shows a simplified diagram of a two-flow low-pressure module, the circulation of the steam being represented in the figure by arrows V.

In this FIG. 1, a rotor 1 of a low-pressure turbine 2 for a thermoelectric power station, in this case a nuclear power station, is shown. In this configuration, the steam enters the turbine 2 substantially at the center thereof and circulates in said turbine 2, passing through five "stages", each stage consisting of a rotor disk 3 secured to one and the same shaft 4 which is able to rotate about a reference axis Δ, each of said disks of the rotor 1 being provided with a plurality of blades 6 distributed over their periphery.

It is to be noted that the number of stages is not exhaustive and may vary. Indeed, in different embodiments, the turbine 2 can comprise, for example, four, five or six stages.

Furthermore, for reasons of clarity, the blades are represented without any connection means, that is to say without a cap 12, and their means for attaching to the disk 3 of the rotor which is secured to the shaft 4 is not illustrated.

Once the steam has entered the turbine 2, it moves substantially axially, in one direction or the other, passing respectively through a first, a second, a third, a fourth and a fifth stage, driving the rotor disks 3 in rotation by the action of said steam on the blades, and thus also driving the shaft 4 in rotation about the reference axis Δ.

Figures 2, 3:
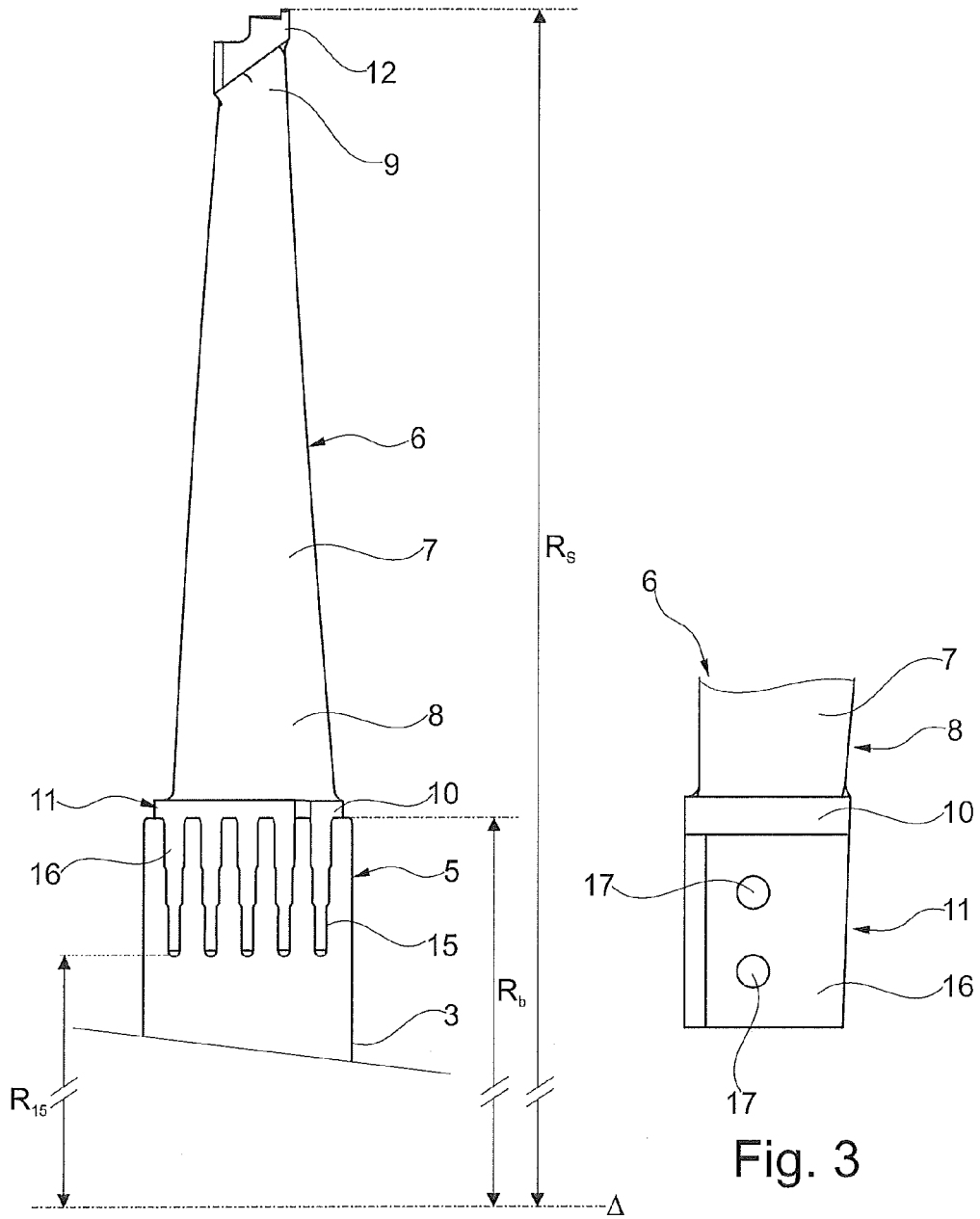
FIG. 2 shows a view of a blade arranged on a rotor disk according to one embodiment.
FIG. 3 shows a view from the right of a root of a blade according to one embodiment.

FIG. 2 shows a view of a blade 6 arranged on a rotor disk according to one embodiment.

This blade 6 is of the slender type, that is to say that it has a ratio of tip radius $R_s$ to base radius $R_b$ which is greater than or equal to 1.5, where:
- the base radius $R_b$ is the distance between the reference axis Δ and the periphery of the disk secured to the shaft; and
- the tip radius $R_s$ is the distance between the reference axis Δ and a cap 12.

Such a blade is generally used in the fourth and/or the fifth stage of a low-pressure turbine 2.

Figure 4:
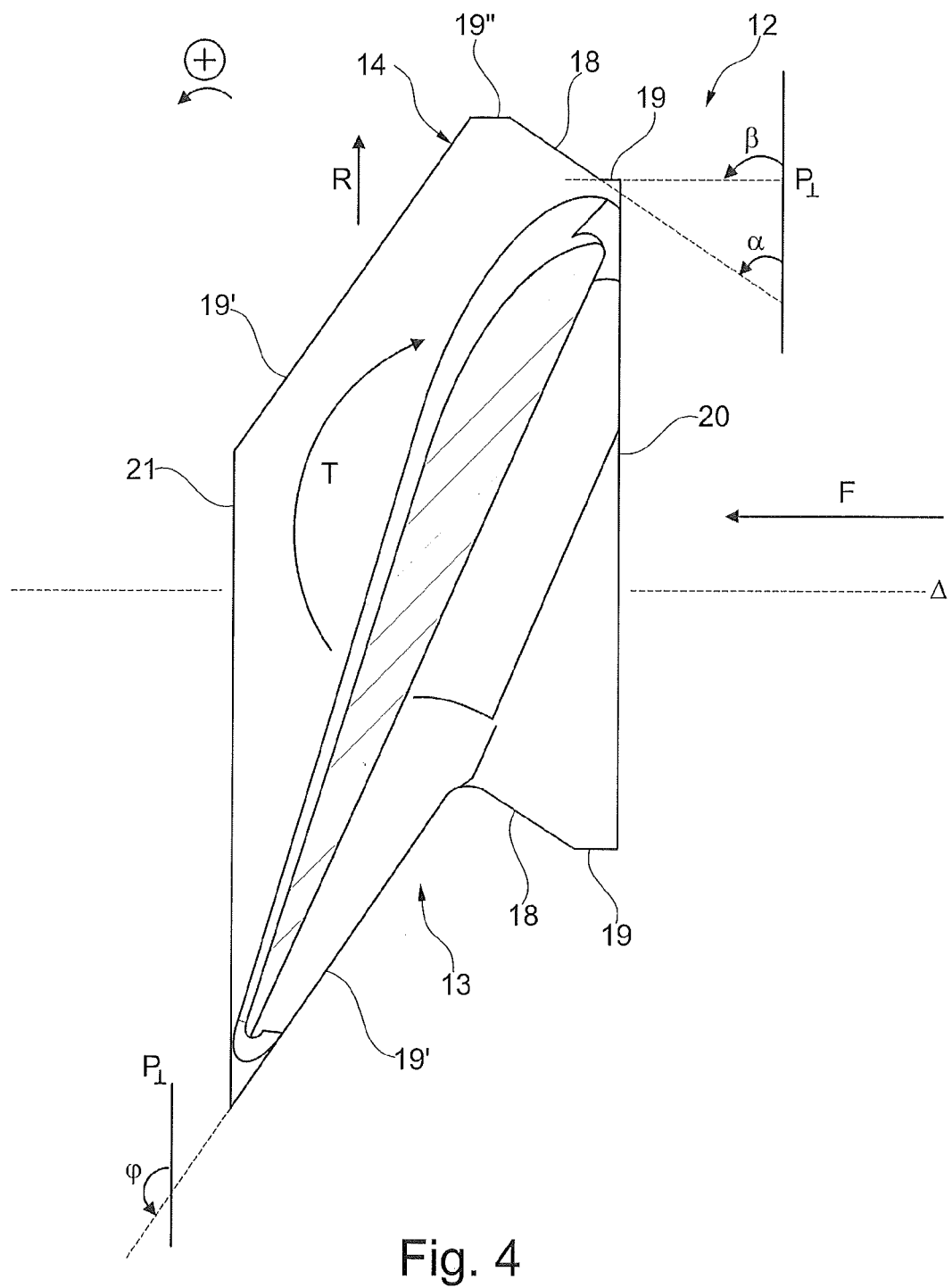
FIG. 4 shows a view from above of a cap of a blade according to one embodiment.

The blade 6 comprises an airfoil 7, and two ends 8, 9:
- a lower end 8 secured to a root 10 having a second interface 11 for engaging with a first interface 5 located at the periphery of a disk 3, the disk 3 being secured to a shaft 4 (not visible in this figure) which can rotate about the reference axis Δ; and
- an upper end 9 secured to a cap 12, said cap 12 having at least one first end 13 and one second end 14 (see FIG. 4).

In this figure, the distance between the blade 6 and the reference axis Δ is not to scale, this axis being illustrated in order to make the device more easily understood.

More precisely, the first interface 5 at the outer periphery of the disk 3 has five slots 15 which are coaxial with respect to the reference axis Δ, are parallel to each other and are of substantially equal radius $R_{15}$. Such slots 15 which are coaxial with respect to the reference axis Δ thus form a slot arrangement which is substantially annular with respect to this reference axis Δ.

Furthermore, the second interface 11 at the lower end of the blade 6 has five projections 16 oriented in the extension of said blade 6.

The blade 6 is represented in a position in which the second interface 11 engages with the first interface 5 of the disk 3, that is to say that the five projections 16 of the blade 6 are inserted such that they engage in the five slots 15, thus locking the blade 6 axially with respect to the rotor disk 3.

The radial movement of the blade 6 is, for its part, locked via the intermediary of the pins.

Indeed, the first 5 and second 11 interfaces each have rows of axial through openings 17 (see FIG. 3). When the five projections 16 of the blade 6 are inserted into the five slots 15, the row of openings of the first interface 5 comes to face the row of openings of the second interface 11 such that they are in alignment, whereupon one and the same pin can pass through them together, radially locking the blade 6 on the disk 3 of the rotor.

More precisely, in this embodiment, two rows of openings are provided on the projections 16 of the blade and pass through these projections, in each case along axes which are orthogonal to the main walls of said projections. These rows of openings are oriented axially when the blade is in the locking position.

The openings 17 are in this case circular, such that, when the rows of openings 17 of the projections 16 and of the slots 15 are in alignment, it is possible to form two cylindrical main openings which open on either side and on two edges of the disk 3, and in which the pins of complementary shape, substantially cylindrical and straight, engage.

A preferred method for installing such a blade 6 comprises the following steps:
- a step of putting in place the blade 6 on the disk 3, in which each of the projections 16 of the second interface 11 of the blade 6 comes to engage, by radial translation of the blade 6 toward the disk 3, with the slots 15 of the first interface 5 of the disk 3; and a step of locking the blades 6 on said disk 3, in which the pins are inserted into the main openings consisting of the rows of openings 17, then in alignment, of the first 5 and second 11 interfaces.

These steps are repeated one by one for each of the blades.

FIG. 3 shows a view from the right of a root of a blade according to this embodiment.

Figure 5:
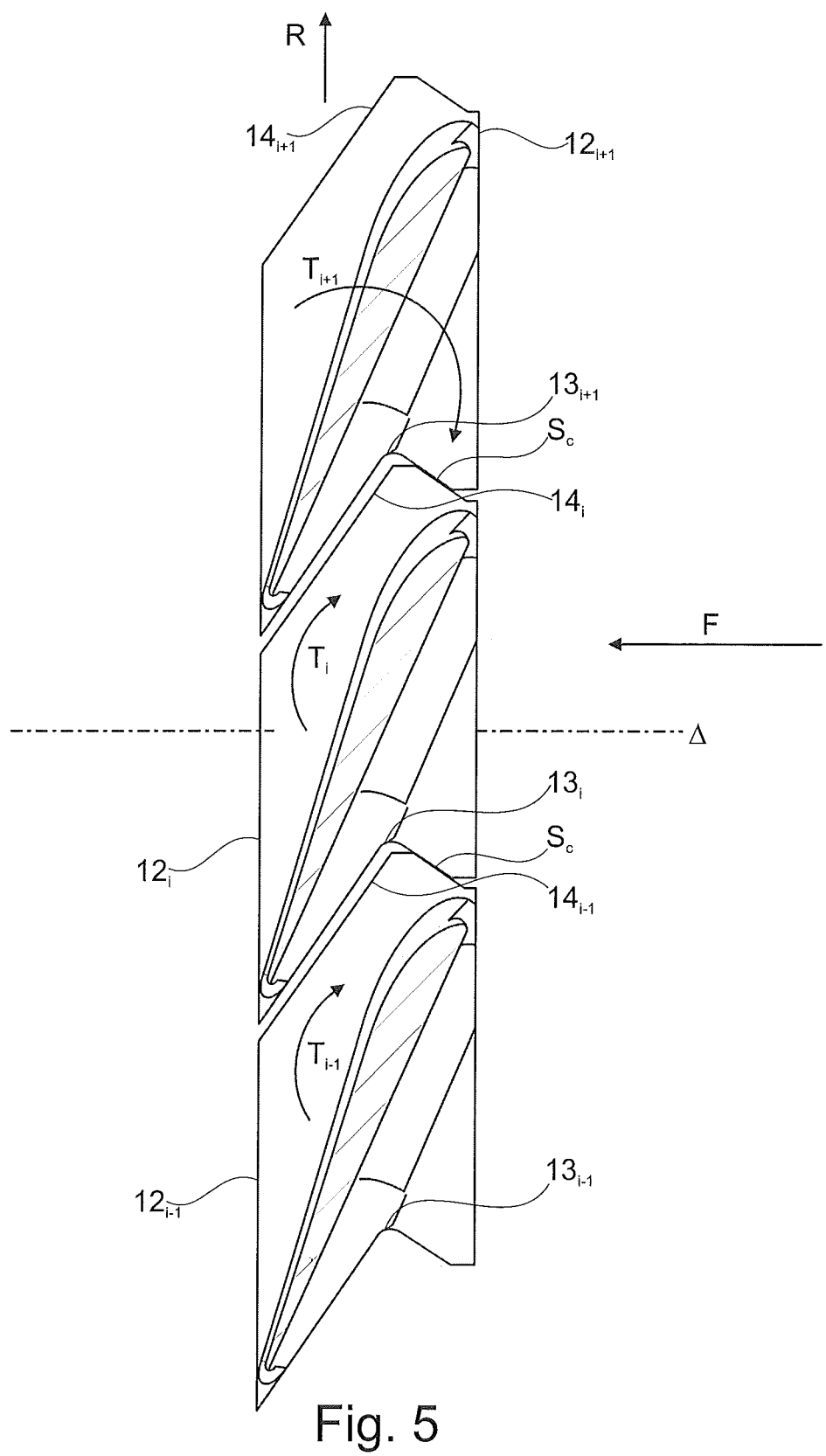
FIG. 5 shows a view from above of three caps engaging two by two, illustrating a part of a cylindrical structure arranged coaxially with the reference axis according to one embodiment.

FIGS. 4 and 5 show, respectively, a view from above of a cap 12 of a blade 6 according to one embodiment and a view from above of three of these similar caps 12 engaging two by two and showing part of a cylindrical structure arranged coaxially with the reference axis $\Delta$.

In these two views, the direction of circulation of a fluid is represented by an arrow F and the direction of rotation of the blade 6 is represented by another arrow R.

More precisely, FIG. 4 represents a cap 12 of a blade 6 in a view from above. The direction of circulation of a fluid is oriented along the reference axis $\Delta$. The direction of rotation R of the blade depends on the aerodynamic profile of the airfoil 7 of the blade 6.

In such a view, a counterclockwise angle is positive, whereas a clockwise angle is negative.

A cap 12 of a blade 6 has a body which extends substantially in a plane which is orthogonal to an axis which is radial to the reference axis $\Delta$, that is also to say perpendicular to an axis of extension of the airfoil 7. This body is delimited laterally, or axially with respect to said reference axis $\Delta$, by two lateral surfaces 20, 21 which are substantially parallel to a plane $P_\perp$ which is orthogonal to the reference axis $\Delta$, wherein a distance separates these said lateral surfaces 20, 21, defining a width of the cap 12.

Moreover, the cap 12 has a first 13 and a second 14 end, each having a main flat surface 18 oriented substantially radially, the main flat surface 18 forming, with the plane $P_\perp$ which is orthogonal to the reference axis $\Delta$, an angle $\alpha$, said angle $\alpha$ being:
  positive with respect to the direction of circulation of a fluid F in the turbine 2 along the reference axis $\Delta$, and substantially equal to 30 degrees; and
  oriented counter to the torsion direction T of the blade 6 due to the fluid F acting on its airfoil 7.

Since the lateral surfaces 20, 21 of the cap are parallel to the plane $P_\perp$ which is orthogonal to the reference axis $\Delta$, the angle $\alpha$ also corresponds to the angle formed between the main flat surface 18 and one of the lateral surfaces 20, 21.

The second end 14 of the caps 12 has:
  a first secondary flat surface 19 located between the main flat surface 18 and a fluid inflow side, bordering the lateral surface 20, said first secondary flat surface 19 forming, with the plane $P_\perp$ which is orthogonal to the reference axis $\Delta$, an angle $\beta$ which is positive with respect to the direction of circulation of a fluid F in the turbine 2, and is substantially equal to 90 degrees; in this embodiment, said first secondary flat surface 19 is bordered both by the main flat surface 18 and by the lateral surface 20;
  a second secondary flat surface 19' located between the main flat surface 18 and a fluid outflow side, said second secondary flat surface 19' being bordered at one of its sides by the lateral surface 21 and forming, with the plane $P_\perp$ which is orthogonal to the reference axis $\Delta$, an angle $\square$ which is positive with respect to the circulation of a fluid in the turbine 2, and is substantially equal to 150 degrees; and
  a third secondary surface 19'' bordered on one side by the first secondary flat surface 19 and on the other side by the second secondary flat surface 19', the third secondary surface 19'' forming, with the plane $P_\perp$ which is orthogonal to the reference axis $\Delta$, an angle equal to 90 degrees.

The second secondary surface 19' forms, with the main flat surface 18 of the second end 14, an acute positive angle which gives the second end the shape of a chevron.

Furthermore, the first end 13 of the naps 12, for its part, has:
  a first secondary flat surface 19 located between the main flat surface 18 and the fluid inflow side, bordering the lateral surface 20, said first secondary flat surface 19 forming, with the plane $P_\perp$ which is orthogonal to the reference axis $\Delta$, a same angle $\beta$; in this embodiment, said first secondary flat surface 19 of the first end 13 is parallel to the first secondary flat surface of the second end 14 and is bordered both by the main flat surface 18 and by the lateral surface 20;
  a second secondary flat surface 19' located between the main flat surface 18 and a fluid outflow side, said second secondary flat surface 19' being bordered at one of its sides by the lateral surface 21 and forming, with the plane $P_\perp$ which is orthogonal to the reference axis $\Delta$, a same angle $\square$; in this embodiment, said second secondary flat surface 19' of the first end 13 is parallel to the second secondary flat surface 19' of the second end 14;
the main flat surface 18 and the second secondary flat surface 19' being connected to one another by a fillet, that is to say a partial circular surface designed to remove a sharp edge.

The first and second ends 13, 14 have similar profiles, with the difference that they are complementary:
  in the first end 13, the second secondary surface 19' and the main flat surface 18 are connected to one another by a fillet; whereas
  in the second end 14, the second secondary surface 19' and the main flat surface 18 are connected to one another by a chamfer bearing the third secondary surface 19''.

This makes it possible, in particular, for the caps of the blades to be able to engage two by two.

Such an arrangement of the caps of the blades engaging two by two is shown by way of example in FIG. 5.

More precisely, the caps 12 of the blades 6 together form, once the blades are installed, a cylindrical structure arranged coaxially with the reference axis $\Delta$. In order to improve clarity, only three of the caps 12 engaging two by two are illustrated here in a view from above.

The first end $13_i$ of one of said caps $12_i$ is arranged so as to engage with the second end $14_{i-1}$ of the cap $12_{i-1}$ which precedes it and the second end $14_i$ of this said cap $12_i$ is arranged so as to engage with the first end $13_{i+1}$ of the cap $12_{i+1}$ which succeeds it, around the rotor disk 3.

Moreover, in this configuration, that is to say when the caps 12 engage two by two and when the rotor 1 is rotating about the shaft 4, a contact surface $S_c$ is formed between two of said adjacent caps 12, said contact surface $S_c$ being located on the main flat surface 18.

As well as driving said rotation of the rotor, the action of the fluid F on each of the blades causes an untwisting effect in these said blades, that is to say a torsion motion $T_i$ of the blade 6 which produces a localized contact pressure on the contact surface $S_c$, which pressure increases as the speed of rotation of the rotor increases.

Indeed, the untwisting effect in the blade bearing the cap $12_i$ corresponds to a torsion motion $T_i$ of the blade about an axis which is substantially radial to the reference axis Δ, this substantially radial axis corresponding to the extension of the airfoil 7 of the blade 6.

From the fact that each of the caps 12 has on its first and second 14 ends a main flat surface 18 forming, with a plane $P_1$ which is orthogonal to the reference axis Δ, an angle α such that:

the angle α is positive with respect to the direction of circulation of the fluid in the turbine 2 along the reference axis Δ, and substantially equal to 30°; and the angle α is oriented counter to the torsion direction T of each of the blades 6 when the rotor is in rotation, it follows that, for two adjacent caps $12_i$, $12_{i+1}$:

the main surface 18 borne by the second end $14_i$ of the cap $12_i$ exerts a first force on the main surface 18 borne by the first end $13_{i+1}$ of the cap $12_{i+1}$, the projection of which onto the reference axis is negative with respect to the direction of circulation of the fluid, this first force being localized at the contact surface $S_c$ and substantially orthogonal to the latter; and that the main surface 18 borne by the first end $13_{i+1}$ of the cap $12_{i+1}$ exerts, on the main surface 18 borne by the second end $14_i$ of the cap $12_i$, a second force which is counter to the first force and the projection of which onto the reference axis is positive with respect to the direction of the circulation of the fluid, this second force being localized at the contact surface $S_c$ and substantially orthogonal to the latter.

The description of the contact between the two caps $12_i$ and $12_{i+1}$ is similar between each of the adjacent caps two by two and the reasoning applies mutatis mutandis to the other caps, for example between the two caps $12_{i-1}$ and $12_i$.

Since the untwisting effect, and thus the torsion motion T, increase as the blades 6 are made to rotate by the effect of the fluid F circulating in the turbine 2 on their airfoil 7, the first and second forces have larger and larger components as the speed of rotation of the rotor increases.

Furthermore, since these forces are opposite and directed toward one another, this results in a localized contact pressure on the contact surface $S_c$, which pressure increases as said speed of rotation of the rotor increases.

In this embodiment, the contact surface $S_c$ represents approximately 80% of the main flat surface 18.

Figure 6:
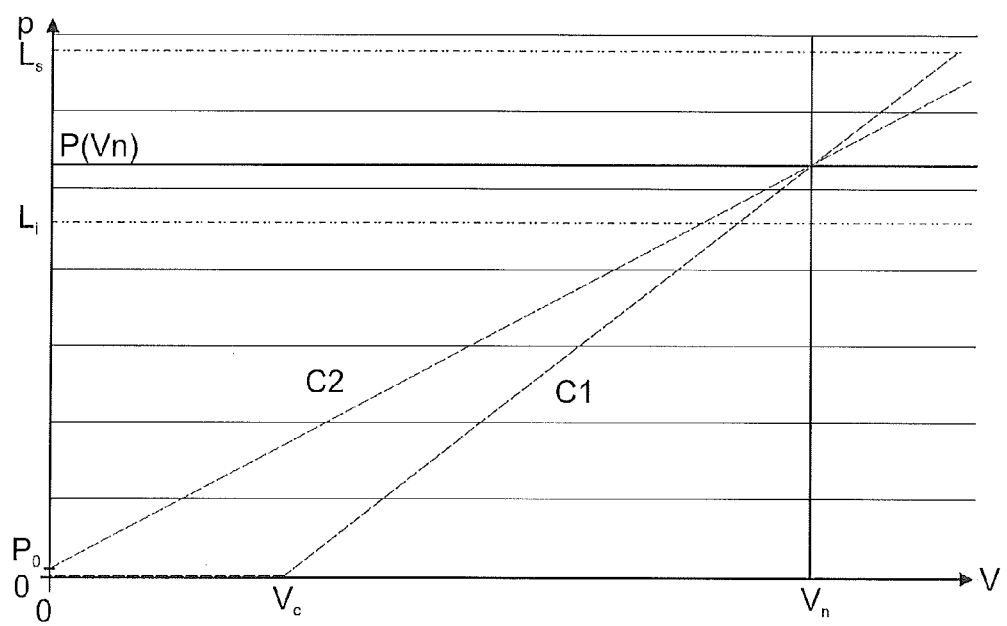
FIG. 6 shows two curves of the change in tightness of the caps as a function of the speed of rotation of a turbine, according to two embodiments.

FIG. 6 shows two curves of the change in tightness of the caps 12 as a function of the speed of rotation of a turbine, according to two embodiments.

The two curves $C_1$, $C_2$ shown here correspond to different blades, in particular ones having different mechanical properties. These blades 6 are in this case both what are termed slender blades 6.

More precisely, the proposed coordinate system has on the abscissa the speed of rotation of the blades 6 and on the ordinate the contact pressure between two adjacent caps 12.

For each of these blades 6, the contact pressure $P(V_n)$ at a nominal speed $V_n$ is the same, but the curves $C_1$, $C_2$ change differently.

Indeed, as regards the change in the contact pressure between two caps 12 of a blade 6 shown in curve $C_1$, it is as follows:

at zero speed, the contact pressure is zero. In other words, the blades are free from any torsion prestress during assembly;

as the speed of rotation increases from zero to a speed $V_c$ where the contact between the caps 12 is initiated, said caps 12 are not in contact, this being a consequence of a clearance between each of the adjacent caps 12 during installation;

as soon as the speed of rotation of the rotor is greater than the speed $V_c$, the contact pressure between each of the caps 12 increases proportionally, illustrated here by a curve having the profile of a straight line, due to the untwisting effect in the blades 6.

As regards the change in the contact pressure between two caps 12 of a blade 6 shown in curve $C_2$, this illustrates an embodiment in which the blades 6 are assembled such that no play remains, when stationary, between two adjacent caps 12, that is to say at zero speed of rotation.

Indeed, although the contact pressure increases proportionally to the speed of rotation, a torsion prestress is in this case applied to the blade 6, when it is installed on the disk 3 of the rotor, such that a non-zero contact pressure $P_0$ remains at zero speed of rotation.

It is specified that such a torsion prestress is not in this case detrimental to the blades as regards the configuration of the caps 12 according to the invention and as regards the fact that the blades are slender. Indeed, in our case, if a torsion prestress is applied during installation, it will not exceed a force which can be applied by hand by an operator. Here it is thus a torsion prestress which is negligible in comparison with that presented in the prior art.

Furthermore, two pressure limits are shown here: a lower limit $L_i$ and an upper limit $L_s$. According to a preferred configuration, the value of the contact pressure $P(V_n)$ at a nominal speed $V_n$ is between the two values of these lower $L_i$ and upper $L_s$ pressure limits.

Indeed, in the event that the contact pressure is greater than the upper pressure limit $L_s$, the stresses applied to the blade 6, in particular at the join between the cap 12 and the airfoil 7, are too great to ensure the mechanical integrity of the assembly and this can lead to destructive mechanical deformations of the rotor.

By contrast, in the event that the contact pressure is less than the lower pressure limit $L_i$, the vibration behavior of the blades is not sufficiently controlled to ensure safe mechanical integrity. Indeed, in this case the eigenfrequencies of the blades 6 are not controlled in a sufficiently precise manner which, when these eigenfrequencies are close to the excitation frequencies, can lead to large mechanical stresses ending in failure of the blades. The contact pressure is preferably greater than 3 MPa.

In our case, the geometry of the caps 12 of the blades 6 as described makes it possible, in particular by configuring the contact surface, to limit or not limit this contact pressure at a nominal speed so as to adjust it between these two limit intervals, all while retaining an ease of assembly of said blades on the disk 3 of the rotor.

The invention is described above by way of example. It is understood that a person skilled in the art will be capable of producing different variant embodiments of the invention without departing from the scope of the invention.

The invention claimed is:

1. A rotor for a low-pressure turbine for a thermoelectric power station, said rotor comprising:

at least one disk secured to a shaft which can rotate about a reference axis (Δ), the at least one disk comprising, on its periphery, a first interface;

a plurality of blades, each of the plurality of blades being slender blades, comprising at least one airfoil and at least two ends:

a lower end secured to a root having a second interface designed to engage with the first interface of the one disk; and an upper end secured to a cap, said cap having at least one first end and at least one second end;

the caps of the plurality of blades together forming, once the plurality of blades are installed, a cylindrical structure arranged coaxially with the reference axis ($\Delta$), the at least one first end of one of said caps being arranged so as to engage with the at least one second end of the cap which precedes it and the at least one second end of said cap being arranged so as to engage with the at least one first end of the cap which succeeds it, around the at least one disk, wherein the first interface of the at least one disk has slots which are coaxial with respect to the reference axis ($\Delta$), are parallel to each other and are of substantially equal radius; the second interface of each of the plurality of blades having projections oriented in an extension of said blade and engaging with at least part of the slots; the first and the second interfaces having rows of axial through openings which are in alignment when said first and said second interfaces engage with each other, and into which pins are inserted; and each of the caps having on its first and second ends a main flat surface oriented substantially radially, the main flat surface forming, with a plane, which is orthogonal to the reference axis ($\Delta$), an angle ($\alpha$), said angle ($\alpha$) being:

positive with respect to a direction of circulation of a fluid in the low-pressure turbine along the reference axis ($\Delta$), and substantially between 20° and 50°; and oriented counter to the torsion direction of the plurality of blades when the rotor is in rotation;

each of the caps having on at least one of the first and the second ends at least one first secondary flat surface located between the main flat surface and a fluid inflow side; and each of the caps having on at least one of the first and the second ends at least one second secondary flat surface located between the main flat surface and a fluid outflow side;

wherein the second end of the caps has at least one third secondary surface bordered on one side by the first secondary flat surface and on the other side by the at least one second secondary flat surface, wherein the at least one third secondary surface forms, with the plane which is orthogonal to the reference axis ($\Delta$), an angle equal to 90 degrees.

2. The rotor according to claim 1, wherein each of the first and the second ends of the caps is roughly in a shape of a chevron.

3. The rotor according to claim 1, wherein when the caps engage two by two and when the rotor is in rotation about the shaft, a contact surface is formed between two of said caps, said contact surface being located on the main flat surface.

4. The rotor according to claim 3, wherein the contact surface represents between 10 and 90% of the main flat surface.

5. The rotor according to claim 1, wherein the first secondary flat surface forms, with the plane which is orthogonal to the reference axis ($\Delta$), an angle ($\beta$) which is positive with respect to the direction of circulation of a fluid in the low-pressure turbine along the reference axis ($\Delta$), and is substantially between 85° and 95°.

6. The rotor according to claim 1, wherein said secondary flat surface forms, with the plane which is orthogonal to the reference axis ($\Delta$), an angle ($\square$) which is positive with respect to the direction of the circulation of a fluid in the low-pressure turbine along the reference axis ($\Delta$), and is substantially between 100° and 175°.

7. A thermoelectric power station, comprising at least one rotor according to claim 1.

8. A method for installing the blades of a rotor, said method comprising:

putting in place the blades on a disk secured to a shaft which can rotate about a reference axis ($\Delta$), wherein the disk comprises, on its periphery, a first interface, the first interface having slots which are coaxial with respect to the reference axis ($\Delta$), and wherein the blades comprise at least two ends:

a lower end secured to a root having a second interface designed to engage with the first interface of the disk, the second interface of each of the blades having projections oriented in a direction of said blade; and an upper end secured to a cap, wherein the cap has a first end and a second end, and wherein the cap has, on the first and the second ends, a main flat surface, at least one first secondary flat surface located between the main flat surface and a fluid inflow side, and at least one second secondary flat surface located between the main flat surface and a fluid outflow side;

wherein the second end of the caps has at least one third secondary surface bordered on one side by the first secondary flat surface and on the other side by the at least one second secondary flat surface, wherein the at least one third secondary surface forms, with the plane which is orthogonal to the reference axis ($\Delta$), an angle equal to 90 degrees; and wherein each of the projections of the second interfaces of the blades comes to engage, by radial translation of the said blade toward the disk which is secured to the shaft, with the slots of the first interfaces of the disk; and locking the blades on the disk, in which pins are inserted into main openings consisting of tows of openings, then in alignment, of the first and second interfaces.

9. The rotor according to claim 1, wherein said first secondary flat surface forms, with the plane which is orthogonal to the reference axis ($\Delta$), an angle ($\beta$) which is positive with respect to the direction of circulation of the fluid in the low-pressure turbine along th reference axis ($\Delta$), and is subsatantially equal to 90°.

* * * * *